United States Patent
Podack

(10) Patent No.: US 8,324,778 B2
(45) Date of Patent: Dec. 4, 2012

(54) PERMANENT MAGNET ROTOR WITH ACCOMMODATING POCKETS, SEALED BY MEANS OF AN ADHESIVE FILM, FOR THE PERMANENT MAGNETS

(75) Inventor: Marcus Podack, Würzburg (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 324 days.

(21) Appl. No.: 12/517,043

(22) PCT Filed: Oct. 31, 2007

(86) PCT No.: PCT/EP2007/061743
§ 371 (c)(1),
(2), (4) Date: Jul. 31, 2009

(87) PCT Pub. No.: WO2008/064969
PCT Pub. Date: Jun. 5, 2008

(65) Prior Publication Data
US 2010/0066190 A1 Mar. 18, 2010

(30) Foreign Application Priority Data
Dec. 1, 2006 (DE) .......................... 10 2006 056 875

(51) Int. Cl.
*H02K 21/12* (2006.01)
*H02K 1/27* (2006.01)
(52) U.S. Cl. .......... 310/156.21; 310/156.53; 310/156.56
(58) Field of Classification Search ............. 310/156.21, 310/156.28, 156.53, 156.14, 156.56, 156.23, 310/156.31, 156.72, 43, 261
See application file for complete search history.

(56) References Cited

U.S. PATENT DOCUMENTS
2005/0099085 A1 5/2005 Du et al.

FOREIGN PATENT DOCUMENTS
| CN | 1277749 A | 12/2000 |
|---|---|---|
| DE | 8803372 U1 | 4/1988 |
| DE | 102004011477 A1 | 9/2004 |
| EP | 1128522 A1 | 8/2001 |
| EP | 1641103 A | 3/2006 |
| JP | 2000037053 A * | 2/2000 |
| JP | 2001-518772 | 10/2001 |
| JP | 2005-312259 | 11/2005 |
| WO | 99/17420 A | 4/1999 |
| WO | WO 99/17420 | 4/1999 |
| WO | 00/14859 A1 | 3/2000 |
| WO | 2006/075727 A1 | 7/2006 |

OTHER PUBLICATIONS

JP 2000037053 A machine translation on Jun. 18, 2011.*
Machine translation of JP2000037053, printed on Mar. 25, 2012.*
International Search Report for PCT/EP2007-061743 dated Mar. 3, 2008.

* cited by examiner

*Primary Examiner* — Burton Mullins
*Assistant Examiner* — Leda Pham
(74) *Attorney, Agent, or Firm* — TraskBritt

(57) ABSTRACT

The invention relates to a permanent magnet rotor, which has a rotor shaft, a rotor stack fixed on the rotor shaft, accommodating pockets provided in the rotor stack and permanent magnets positioned in the accommodating pockets. The accommodating pockets are sealed by means of an adhesive film, as a result of which the permanent magnets are fixed in the accommodating pockets and at the same time the ingress of particles into the accommodating pockets and the discharge of particles out of the accommodating pockets is prevented.

5 Claims, 2 Drawing Sheets

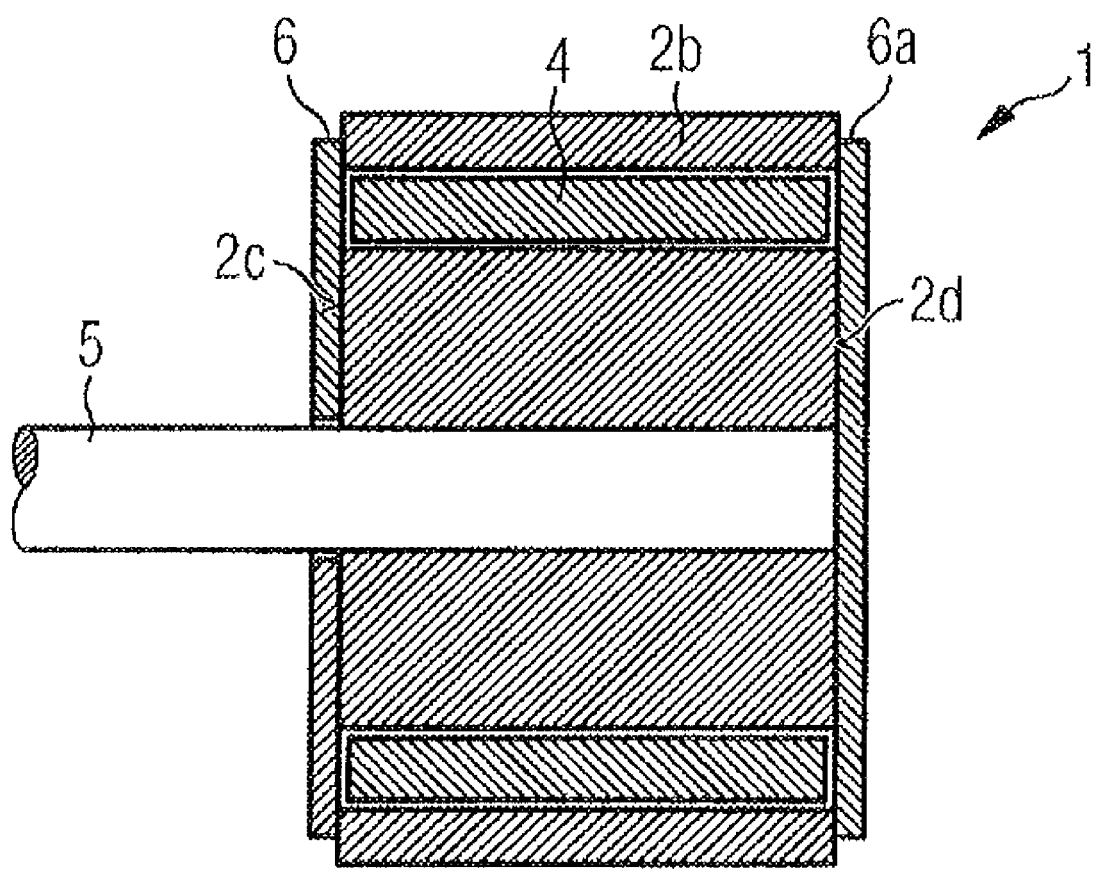

Figure 1:
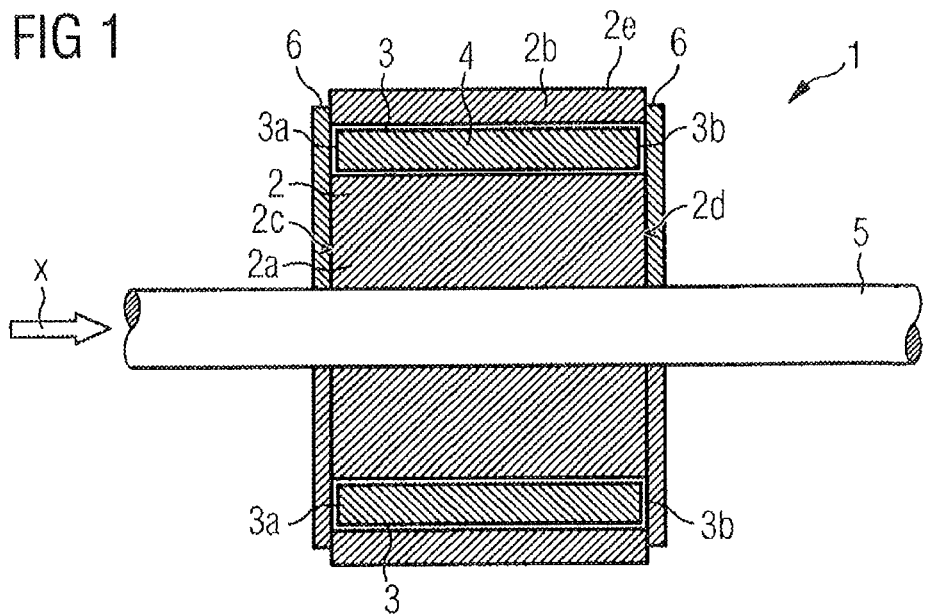

PERMANENT MAGNET ROTOR WITH ACCOMMODATING POCKETS, SEALED BY MEANS OF AN ADHESIVE FILM, FOR THE PERMANENT MAGNETS

Permanent magnet rotor with accommodating pockets, sealed by means of an adhesive film, for the permanent magnets The invention relates to a permanent magnet rotor which has a rotor shaft, a rotor stack fastened to the rotor shaft, accommodating pockets provided in the rotor stack and permanent magnets positioned in the accommodating pockets.

DE 198 51 883 A1 discloses a permanent-magnet-excited synchronous machine with a sheet-laminated rotor stack into which permanent magnets are embedded. At least one magnetic flux barrier is provided at least between a recess for accommodating a permanent magnet consisting of at least one magnetic plate and the air gap of the synchronous machine. At the virtual meeting of two recesses which serve for accommodating the permanent magnets, the recesses are shaped such that, in addition to a fixing of the permanent magnets, stray webs are also obtained.

A permanent-magnet-excited rotor for an electric machine is known from U.S. Pat. No. 4,486,679 A. This known rotor has in its rotor sheet stack recesses into which permanent magnets are introduced. Webs running in the radial direction are provided between adjacent recesses. Thin bridges are located between the outer margins of the recesses and the outer circumference of the rotor sheet stack. The permanent magnets are fixed in the recesses by the bridges being pressed in and due to the resulting deformation of the webs extending in the radial direction.

It is already known, furthermore, for permanent magnets provided in recesses of a rotor stack to be adhesively bonded, sealed in or fastened, using clamps, within these recesses.

The object of the invention is to develop a permanent magnet rotor which has a rotor shaft, a rotor stack fastened to the rotor shaft, accommodating pockets provided in the rotor stack and permanent magnets positioned in the accommodating pockets, in such a way that the fastening of the permanent magnets in the accommodating pockets is simplified.

This object is achieved by means of a permanent magnet rotor having the features specified in claim 1. Advantageous refinements and developments of a permanent magnet rotor according to claim 1 are specified in the dependent claims.

The advantages of a permanent magnet rotor according to the invention are that the fastening of the permanent magnets in the accommodating pockets of the rotor stack can take place in a very simple way. Each permanent magnet does not have to be fixed individually in the respective accommodating pocket. Instead, it is sufficient to apply a single adhesive film for each end face of the rotor stack in order to fix all the permanent magnets of a permanent magnet rotor.

Furthermore, using the adhesive film claimed, a leaktight sealing of the accommodating pockets is achieved, so that, while the rotor is in operation, reliable protection against a penetration of particles into the accommodating pockets is afforded, and it is also ensured that no particles can be thrown out of the accommodating pockets. Moreover, using an adhesive film, a protection of the permanent magnets against corrosion is achieved. Furthermore, by means of the adhesive film, even those rotor parts which lie between the outer radial margins of the accommodating pockets and the outer circumference of the rotor are fixed. Further, during the assembly and during a demounting of the entire rotor, these rotor parts lying between the outer radial margins of the accommodating pockets and the outer circumference of the rotor are protected against damage by the adhesive film claimed. Finally, the mass unbalance is also reduced.

Figure 2:
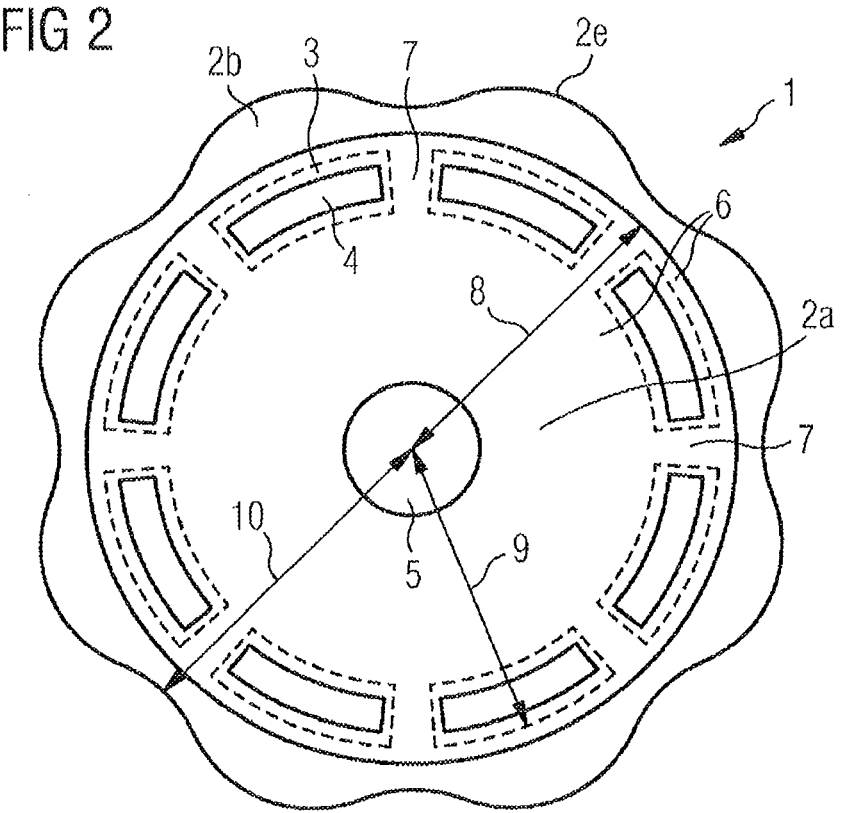

Further advantageous properties of the invention may be gathered from the following exemplary explanation of it, with reference to the drawings in which:

FIG. 1 shows a longitudinal sectional illustration of a permanent magnet rotor according to the invention, FIG. 2 shows a view of the permanent magnet rotor illustrated in FIG. 1 in the direction of the arrow x shown in FIG. 1, and FIG. 3 shows a longitudinal sectional illustration of a permanent magnet rotor according to a further embodiment of the invention.

FIG. 1 shows a longitudinal sectional illustration of a permanent magnet rotor 1 according to the invention. This has a rotor shaft 5 to which a rotor stack 2 is fastened. This rotor stack is a rotor sheet stack which is composed of a multiplicity of sheet lamellae or sheet laminations. The rotor stack illustrated has an inner region 2a, which lies between the rotor shaft 5 and accommodating pockets 3 of the rotor stack, and an outer region 2b, which lies between the accommodating pockets 3 and the outer circumference 2e of the rotor stack. Furthermore, the rotor stack 2 shown has end faces 2c and 2d.

Permanent magnets 4 are inserted into the accommodating pockets 3 of the rotor stack 2. The insertion of these permanent magnets 4 into the accommodating pockets takes place, for example, in the direction of the arrow x shown in FIG. 1.

Adhesive films 6 serve for fixing the permanent magnets 4 in the accommodating pockets 3 and are glued to the end faces 2c and 2d of the rotor stack.

In the exemplary embodiment shown in FIG. 1, the accommodating pockets 3 have in each case two orifices 3a and 3b, of which one is provided on the end face 2c of the rotor stack 2 and the other on the end face 2d of the rotor stack 2. Consequently, in this exemplary embodiment, overall, two adhesive films are used for fixing the permanent magnets 4 in the accommodating pockets 3, one of these adhesive films being provided on the end face 2c of the rotor stack and the other adhesive film being provided on the end face 2d of the rotor stack.

According to a further exemplary embodiment not illustrated in the figures, the accommodating pockets have in each case only one orifice, for example on the end face 2c of the rotor stack. In this further exemplary embodiment, the in each case other end region of the accommodating pockets is designed to be closed. In this further exemplary embodiment, to fix the permanent magnets in the accommodating pockets, only a single adhesive film is necessary which is applied to the end face 2c of the rotor stack.

FIG. 2 shows a view of the permanent magnet rotor illustrated in FIG. 1 in the direction of the arrow x shown in FIG. 1.

It is clear from this FIG. 2 that, in this exemplary embodiment, the outer circumference 2e of the rotor stack does not run circularly, but has a shape of essentially sinusoidal design. The smallest radius of the outer circumference 2e of the rotor stack 2 is designated in FIG. 2 by reference numeral 10.

It may be gathered, further, from FIG. 2, that the radius 8 of the adhesive film, which has a circular outer circumference, is smaller than the abovementioned smallest radius 10 of the outer circumference 2e of the rotor stack 2, but is larger than the radius 9 corresponding to the radially outer margins of the accommodating pockets 3.

The choice of such a radius 8 for the adhesive film has several advantages. On the one hand, what is achieved thereby is that the accommodating pockets 3, depicted by dashes in FIG. 2, together with the permanent magnets 4 located in them and not depicted by dashes for the sake of clarity, are covered completely by the adhesive film 6. This has the advantage, in particular, that, when the permanent magnet rotor is in operation, reliable protection against a penetration of particles into the accommodating pockets is afforded, and it is also ensured that no particles can be thrown out from the accommodating pockets outwardly. Further, by the orifices of the accommodating pockets being covered completely, a protection of the permanent magnets against corrosion is achieved.

Moreover, what is achieved by the above-described choice of the radius 8 of the adhesive film 6 is that even the outer regions 2b of the rotor stack, that is to say those regions which lie in the radial direction between the accommodating pockets 3 and the outer circumference 2e of the rotor stack, are fixed and are protected against damage.

A further advantage of the above-described choice of the radius 8 of the adhesive film 6 is that the adhesive film can be used independently of the in each case prevailing shape of the outer circumference of the rotor stack. For example, it can be used both in the case of a sinusoidal outer circumference of the rotor stack, as shown in FIG. 2, and in the case of a circular outer circumference and also when the outer circumference of the rotor stack has a different shape.

A further advantage of the invention is that additional components, such as adhesives, a sealing compound and/or clamps, are not necessary for fixing the permanent magnets in the accommodating pockets. The functions of these additional components are assumed completely by the single adhesive film used, insofar as the accommodating pockets have in each case only one orifice, or by the two adhesive films used, insofar as the accommodating pockets have in each case two orifices. This adhesive film or these adhesive films is or are simple to apply. Only a single adhesive film, insofar as the accommodating pockets have in each case only one orifice, or only two adhesive films, insofar as the accommodating pockets have in each case two orifices, is or are necessary. In addition, the adhesive films prevent a penetration of particles into the accommodating pockets and, consequently, prevent particles from reaching the permanent magnets and particles from being thrown out of the accommodating pockets.

During operation, because of their magnetization, the permanent magnets are basically protected automatically from slipping out of place within the respective accommodating pocket, since they are held in the middle of the respective accommodating pocket by the prevailing magnetic forces. If, however, high accelerations occur during operation, the permanent magnets could nevertheless slip out of place within the respective accommodating pocket. In the permanent magnet rotor according to the invention, this is prevented by the use of the above-described adhesive film or adhesive films which absorbs or absorb the forces occurring during acceleration.

The permanent magnet rotor described above is preferably a permanent magnet rotor provided for an actuating drive of a motor vehicle. The actuating drive serves, for example, as a windshield wiper motor, as a window lifter motor, as a steering motor or as a motor for electrical seat adjustment.

FIG. 3 shows a longitudinal sectional illustration of a permanent magnet rotor according to a further embodiment of the invention. This further embodiment differs from the embodiment described above in that, on the end face 2d of the rotor stack, the rotor shaft 5 terminates flush with the end face of the rotor stack in the axial direction. In this further embodiment, the adhesive film 6a provided on the end face 2d for fixing the permanent magnets 4 has no clearance in its middle region.

The invention claimed is:

1. A permanent magnet rotor, which comprises a rotor shaft (5), a rotor stack (2) fastened to the rotor shaft, accommodating pockets (3) provided in the rotor stack and permanent magnets (4) positioned in the accommodating pockets, characterized in that the accommodating pockets (3) are sealed by means of an adhesive film (6) in order to fix the permanent magnets in the accommodating pockets with no additional fastening elements, wherein the accommodating pockets (3) comprise in each case an orifice (3a, 3b) on an end face (2c, 2d) of the rotor stack, and these orifices are sealed by means of an adhesive film provided on this end face of the rotor stack.

2. The permanent magnet rotor as claimed in claim 1, characterized in that the adhesive film (6) comprises a circular outer circumference.

3. The permanent magnet rotor as claimed in claim 1, characterized in that the accommodating pockets comprise in each case an orifice (3a, 3b) on both end faces (2c, 2d) of the rotor stack, and an adhesive film for sealing the accommodating pockets is provided in each case on the two end faces of the rotor stack.

4. The permanent magnet rotor as claimed in claim 3, characterized in that the adhesive films (6) in each case comprise a circular outer circumference.

5. The permanent magnet rotor as claimed in claim 1, characterized in that the radius (8) of the adhesive film (6) is smaller than the smallest radius (10) of the outer circumference of the rotor stack.

* * * * *